Feb. 23, 1937.    A. COHEN    2,071,613
CLUTCH MECHANISM FOR COMBUSTION MOTORS
Original Filed May 11, 1931    2 Sheets-Sheet 1
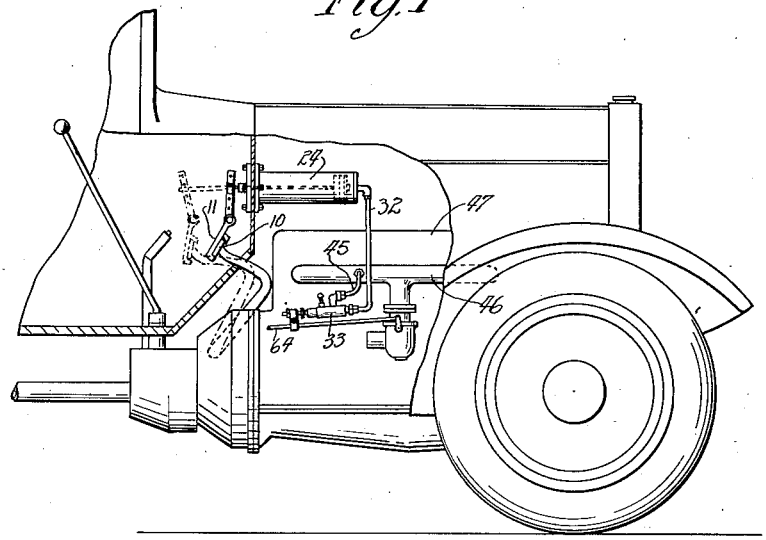
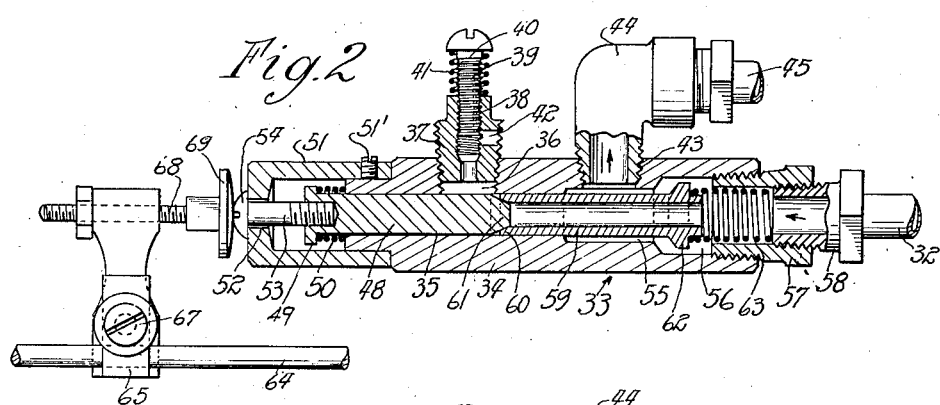
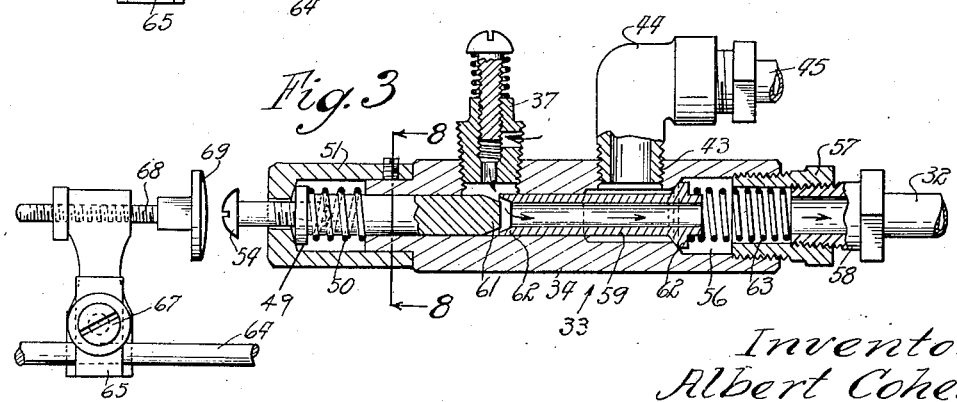
Inventor
Albert Cohen
by Henry Hech
Attorney.

Feb. 23, 1937. A. COHEN 2,071,613
CLUTCH MECHANISM FOR COMBUSTION MOTORS
Original Filed May 11, 1931 2 Sheets-Sheet 2
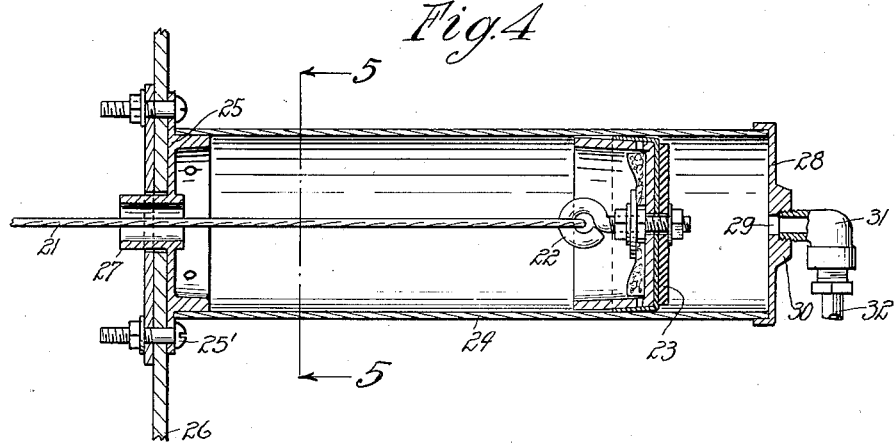
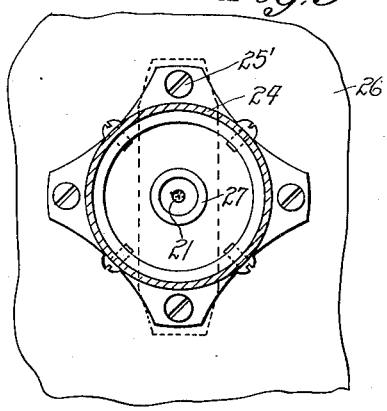
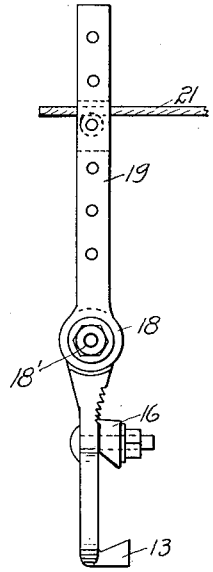
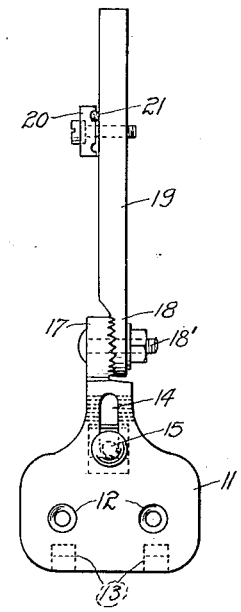
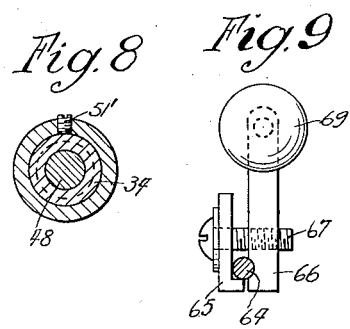
Inventor
Albert Cohen
by Henry Blech
Attorney Patented Feb. 23, 1937

2,071,613

UNITED STATES PATENT OFFICE 2,071,613

CLUTCH MECHANISM FOR COMBUSTION MOTORS

Albert Cohen, Chicago, Ill., assignor, by mesne assignments, to Bragg-Kliesrath Corporation, South Bend, Ind., a corporation of New York Application May 11, 1931, Serial No. 536,483
Renewed March 11, 1935

3 Claims. (Cl. 192—.01)

The invention relates to clutch mechanism for combustion motors, and its principal object is to provide a clutch which is controlled from the gas pedal.

A further object aims at providing a clutch mechanism which is controlled from the accelerator rod.

It is also an object of the invention to provide a clutch mechanism permitting free wheeling of a motor vehicle automatically upon stopping the feed of gas.

It is a further object of the invention to provide a clutch mechanism which permits shifting of the gears without previous actuation of the clutch pedal.

A still further object aims at providing automatically acting hydraulic means for actuating the clutch.

A still further object aims at providing hydraulic means for actuating the clutch of a motor vehicle, said means being controlled by the gas supply.

A further object aims at providing hydraulic means for actuating the clutch, a valve for said hydraulic means, and means for controlling said valve from the gas supply.

A still further object aims at providing automatic actuating means for the clutch of a motor vehicle, which actuating means may be applied to cars already in existence.

It is also an object of the invention to provide certain details of construction and arrangement of parts tending to enhance the effectiveness and reliability of a mechanism of the character described.

With these and other equally important objects in view which will become apparent from a perusal of the invention, the latter comprises the means described in the following specification, particularly pointed out in the claims forming a part thereof, and illustrated in the accompanying drawings, in which Fig. 1 is a fragmentary side view of the front part of an automobile to which my invention has been applied, parts being shown in section to disclose interior construction.

Fig. 2 is a longitudinal section through the valve mechanism.

Fig. 3 is a similar section with parts shown in a different position.

Fig. 4 is a section through the actuating cylinder of a clutch.

Fig. 5 is a section on the line 5—5 of Fig. 4.

Fig. 6 is a side view of links connecting the clutch pedal with the actuating cylinder.

Fig. 7 is a front view of the parts shown in Fig. 6.

Fig. 8 is a section on the line 8—8 of Fig. 3, and

Fig. 9 is a front view of an attachment for the accelerator rod.

Referring to the several views in the drawings, only such parts of the motor vehicle will be described as are necessary for a complete understanding of the invention.

To the clutch pedal 10 is secured a plate 11 secured thereto by a plurality of screws 12 and formed with abutment claws 13 which engage the lower edge of the pedal 10. The plate 11 is provided with a vertical slot 14 through which extends a bolt 15 for adjustably securing a claw 16 adapted to engage the upper edge of the pedal 10. The plate 11 is formed preferably integral with a circular member 17, having one face serrated and interfits with such serrated face a complementary constructed circular member 18 forming the lower end of a bar 19. The members 17 and 18 are held together by a bolt 18'. A clamp member 20 is secured to the bar 19 in order to clamp thereto the end of a rope or cable 21 which is secured at its other end to an eye 22 attached to a piston 23 which is reciprocatingly fitted in a cylinder 24.

The cylinder is closed at the forward end by a flange cover 25 and secured in any preferred or appropriate manner to a vertical board 26 of the automobile or other motor vehicle, preferably by screws 25'.

The cover 25 is equipped with a tubular member 27 at its center to provide for the passage of the cable 21. The rear end of the cylinder 24 is closed by a cover 28 which is formed with a central aperture 29 extending through a boss 30 of said cover in which is received the threaded end of an elbow 31, from which a pipe 32 leads to a valve mechanism generally designated by 33.

The valve mechanism comprises a chest 34 provided with a longitudinal bore 35 extending throughout the length of said chest and equipped with a port 36 equipped with threads to receive the lower threaded portion of an air valve 37 which is also equipped with a longitudinal bore 38 to receive the stem 39 of a screw 40, there being a spring 41 interposed between the body of the air valve 37 and the head of the screw 40.

The stem of the screw extends slightly below the upper edge of a port 42 which thus connects with the longitudinal bore 38 opening into the port 36. A second port 43 receives the threaded end of an elbow 44 whence a pipe 45 leads to the intake manifold 46 of the combustion motor 47.

In the longitudinal bore 35 is slidingly arranged a valve 48 which extends therebeyond and is formed with a head 49 between which and the adjacent end of the body member 34 a spring 50 is interposed to urge the valve 48 toward the left as viewed in Fig. 2.

The chest 34 is equipped with a hood or cover 51 secured in place by a set-screw 51' and having a central aperture 52 for the passage of a bolt 53 screwed into the valve 48. The head 54 of said bolt limits the extent to which the valve may be moved toward the right, as viewed in Fig. 2.

The opposite end of the chest 34 is provided with a chamber 55 which is enlarged as at 56 to receive a gland 57 which is threaded into the chest 34. The gland 57 has threaded thereto a fitting 58 to which the pipe 32 is connected, which as aforementioned leads to the cylinder 24.

In the bore 35 a second valve 59 is provided which has a conical end 60 to interfit with the tapered end 61 of the valve 48. The valve 59 is formed with a circumferential flange 62 to provide a seat for a spring 63 whose other end bears on the adjacent end of the gland 58.

The accelerator rod 64 is provided with clamping members 65 and 66 which are held together by a screw 67. The member 66 at its upper end being provided with a longitudinal bore for the passage of a screw 68, having a head 69 which is adapted to engage with a head 54 of the bolt 53 projecting from the valve 48.

The operation of the device is as follows:

When the motor is idling suction is set up in the manifold 46, the pipe 45, the chamber 55, and through the pipe 32 in the cylinder 24 causing thereby a movement of the piston 23 toward the right as viewed in Fig. 4, whereby the pedal 10 occupies the full line position shown in Fig. 1, and thus maintaining the clutch disengaged.

Upon gas being fed the accelerator rod 59 is caused to move toward the left as viewed in Figs. 1 and 3, enabling thereby the valve 48 to move toward the left under the expansion of the spring 50, so that the valve parts occupy the position shown in Fig. 3, in which the valve 48 is receded from the valve 59 while the flange 62 of the valve 59 engages the bottom of the chamber 56 interrupting the communication between the pipes 45 and 32.

In the position shown in Fig. 3, air is admitted through the port 42 and passes into the port 36 through the interspace formed by the valves 48 and 59, and forces through the pipe 32 into the cylinder 24 where it causes the piston 23 to move toward the left, so that the spring operating the clutch pedal pulls the piston out again and permits the clutch to occupy functional position.

From the foregoing, it is evident that the moment the gas pedal is released the clutch will be automatically disengaged so that the shifting of the gear lever can be effected without paying any attention to the clutch pedal. This is an important provision because stripping of the gears is eliminated and in addition a safeguard factor is provided in the automatic operation of the clutch without necessitating attention on the part of the driver.

It is especially noteworthy that the present equipment for the automatic operation of the clutch may be applied to any standard motor car, there being no changes required except the attachment of the parts to the clutch pedal, to the dash board, to the manifold, and to the accelerator rod.

While the drawings disclose a preferred embodiment of the invention, the same are merely illustrated by way of explanation and not by way of limitation.

Innumerable changes, alterations and revisions may be made within the purview of the invention.

I, therefore, do not limit myself to the details of construction or arrangement of parts as shown, but claim my invention as broadly as the state of the art permits.

I claim:

1. In a combustion motor, in combination with the clutch, the gas pedal, the intake manifold, and means for actuating said clutch, of a valve comprising a chest having a spring controlled valve member therein controlling communication between said actuating means, the intake manifold, and the atmosphere, respectively, and a spring controlled actuating member in said valve chest operated by said gas pedal and controlling said spring controlled valve member.

2. In a clutch control device, a control valve comprising a chest having an atmospheric port, a port adapted to be connected to a source of power, and a port adapted to be connected to a clutch operating motor, a spring controlled valve member in said chest adapted to control communication between said two last-mentioned ports, and a second valve member operable to actuate said first-mentioned valve member and also to control the communication between said atmospheric port and motor port.

3. In a clutch control device provided with a pressure differential operated motor, a three-way control valve for said motor comprising a valve chest having atmospheric, power and motor ports, a valve member biased to close communication between said power and motor ports, and a second valve member operative both to control communication between said atmospheric and motor ports and to move said first-mentioned valve member to interconnect said power and motor ports.

ALBERT COHEN.